United States Patent [19]

Breslauer

[11] Patent Number: 5,718,758
[45] Date of Patent: *Feb. 17, 1998

[54] ULTRA-LIGHT HIGH MOISTURE RETENTION TITLE MORTAR

[76] Inventor: Charles S. Breslauer, 10709 Flotilla Ct. SE., Hobe Sound, Fla. 33455

[*] Notice: The term of this patent shall not extend beyond the expiration date of Pat. No. 5,542,358.

[21] Appl. No.: 517,296

[22] Filed: Aug. 21, 1995

[51] Int. Cl.⁶ .................... C04B 14/18; C04B 14/20
[52] U.S. Cl. ................ 106/698; 106/716; 106/801; 106/DIG. 2
[58] Field of Search .................. 106/698, 716, 106/801, DIG. 2

[56] References Cited

U.S. PATENT DOCUMENTS

| | | | |
|---|---|---|---|
| 3,667,978 | 6/1972 | Vassalovsky et al. | 106/195 |
| 3,841,885 | 10/1974 | Jakel | 106/664 |
| 3,887,385 | 6/1975 | Quist et al. | 106/96 |
| 3,900,332 | 8/1975 | Davis | 106/97 |
| 3,902,911 | 9/1975 | Messenger | 106/97 |
| 4,021,257 | 5/1977 | Barnett | 106/90 |
| 4,144,078 | 3/1979 | Colwell | 106/97 |
| 4,268,316 | 5/1981 | Wills, Jr. | 106/97 |
| 4,293,341 | 10/1981 | Dudley et al. | 106/675 |
| 4,377,416 | 3/1983 | Maul et al. | 106/98 |
| 4,390,372 | 6/1983 | Hardin | 106/90 |
| 4,415,366 | 11/1983 | Copening | 106/86 |
| 4,851,456 | 7/1989 | Dean | 523/122 |
| 4,935,034 | 6/1990 | Alexander | 52/415 |
| 4,953,752 | 9/1990 | Tonsignant et al. | 222/23 |
| 4,956,821 | 9/1990 | Fenslen | 366/9 |
| 4,957,951 | 9/1990 | Marohn | 523/401 |
| 4,971,627 | 11/1990 | Koslowski et al. | 106/732 |
| 4,980,401 | 12/1990 | Hinden | 523/461 |
| 4,997,284 | 3/1991 | Tonsignant et al. | 366/8 |
| 5,076,851 | 12/1991 | Skovara et al. | 106/713 |
| 5,080,022 | 1/1992 | Carlson | 106/698 |
| 5,084,102 | 1/1992 | Brouns et al. | 106/707 |
| 5,108,679 | 4/1992 | Rirsch et al. | 264/118 |
| 5,112,405 | 5/1992 | Sanchez | 106/608 |
| 5,167,710 | 12/1992 | Leroux et al. | 106/711 |
| 5,169,307 | 12/1992 | Frye | 432/14 |
| 5,174,819 | 12/1992 | Carlson | 106/698 |
| 5,175,277 | 12/1992 | Rakitsky et al. | 536/114 |
| 5,290,355 | 3/1994 | Jakel | 106/675 |
| 5,328,507 | 7/1994 | Crocker | 106/672 |
| 5,395,442 | 3/1995 | Dunton et al. | 106/724 |
| 5,542,358 | 8/1996 | Breslauer | 106/698 |

Primary Examiner—Paul Marcantoni
Attorney, Agent, or Firm—John C. Smith

[57] ABSTRACT

A premixed ultra-light sandless mortar for use with clay and concrete tiles. The mortar uses ASTM standard C-332 aggregate, vermiculite or perlite aggregate in place of heavy aggregates such as sand. The mortar cement is made from portland cement, lime, air entraining agents, and water repelling agents. The resulting compound retains large amounts of moisture which increases hydration time resulting in improved bonding strength, and increased tile uplift strength. The light weight of the mortar also allows a full bed of mortar to be laid on the roof with the resulting benefit of an addition insulating layer for the building. The mortar is suitable for roofing or floor tile applications.

8 Claims, 1 Drawing Sheet

ULTRA-LIGHT HIGH MOISTURE RETENTION TITLE MORTAR

BACKGROUND OF THE INVENTION

1. Technical Field

The present invention relates to mortars for use with clay or concrete tiles. In particular, it relates to ultra-light sandless mortars for clay or concrete tiles which retain high moisture content that compensates for absorption by dry tiles and enables mortar to retain plasticity for proper hydration and provide time for a strong bond to develop between tile and mortar as well as between mortar and sub-surface.

2. Background Art

For many years the construction industry has utilized both clay and concrete tiles for residential and commercial uses, notably roof covering and floor tiles. The roofing industry has historically utilized job-site mixed sanded mortar to install the tile on top of the waterproofing membranes previously applied to the roof. The top membrane to which the tile is applied is typically a mineral surfaced roofing sheet which is normally a 90 lb. per 100 sq. ft. material. More recently tile may be also applied over a "modified bitumen" mineral surfaced roofing using the same mortar application. In the roofing industry the term "mudding" is often used to describe the application of the tile to the roofing membrane with mortar.

The mortar used to apply tile normally consists of the combination of mortar cement and sand in a ratio of approximately three (3) parts sand to one (1) part cement. Specifications generally allow from 2.25:1 to 3:1 maximum sand to cement ratios. The mortar is generally mixed at the job-site in a gasoline or electric powered mortar mixer. The ingredients are bulk delivered sand and bagged tile cement or mortar cement. The mix generally consists of approximately 15 shovels of sand and one eighty (80) lb. bag of mortar cement. Water is added to achieve a consistency that allows good workability. Generally a mix with these qualities, using two (2) trowels of mortar, will allow application of about fifty-five (55) tiles. However, the mix may be extended by the addition of more sand into the mix as well as the use of a lesser amount of mortar per tile. While the term sand is used throughout this disclosure for ease of discussion, those skilled in the art will recognize that sand may include other heavy aggregates, such as gravel and crushed stone.

One of the major problems related to the prior art use of job-site mixed sanded mortars for tile application is the fact that sanded mortars utilize very little water to achieve a desirable consistency or workability for application. Tiles are usually placed in fair weather when the sun is out and the roofing is hot. While the best method of applying tiles is to presoak them in water, the reality of the workplace is that the tiles are usually applied dry and tend to absorb water. In addition to the reduction in mortar moisture caused by dry tiles, a breeze or wind will also tend to dry the mortar. The combination of low water content in sanded mortars; a warm or hot surface; the drying effects of wind; and the absorbency of dry tiles will remove excessive amounts of water from the mortar before the tile has had an opportunity to bond properly to the mortar or the mortar has properly bonded to the roofing prior to the mortar taking a "set" and becoming hardened. The rapid drying may also adversely effect the strength of the mortar since the cement requires the moisture for proper hydration. By its nature, sanded mortar limits the amount of moisture available for the cement hydration process which causes the resulting hardened mortar to have reduced strength.

As a result of these common application problems mortar frequently does not set properly. A consequence of the inadequate setting is the reduced bonding strength of the tiles to the target surface. In turn, inadequate bonding causes premature failure of tiles which ultimately increases the cost of building maintenance. A second disadvantage is the reduced strength of the set mortar due to inadequate hydration.

A consequence of the bonding problems discussed above is the increased level of expense due to bond failure. In normal weather environments, storms can cause extensive damage to roofing tiles and roofs. Further, in areas which are prone to high level winds, such as the southeastern coast of the United States which is periodically exposed to hurricane strength winds, bond failures can result in tiles breaking free from roofs and acting as projectiles. In turn, the exposed underlayment of the roof can fail, causing extensive damage to the entire building. For example, during hurricane Andrew in 1993, many tile roofs were damaged and loosened, causing massive economic damage as well as danger to life and limb of residents. A significant factor in that damage, and a cause of unnecessary structural damage to buildings was the failure of prior art sanded mudding techniques to provide sufficient uplift resistance to prevent tiles from breaking free from roofs, thereby initiating the cycle resulting in complete roof failure. The present commonly used system of tile application with job-site prepared sand mortars, or "mudding" of tile, does not assure that roofs will stay intact during extreme weather conditions such as hurricanes, and in fact, results in unnecessarily high tile failure rates in normal weather conditions.

Another drawback to prior art sanded mortars is the work and safety problems related to the additional weight caused by the sand. Due to the weight of the sand, sanded mortars tend to be very heavy. The high weight contributes to worker injury, especially back problems, when laborers must carry the sanded mortar to the roof for applying roof tiles and even when carrying the mortar for application to floors.

The high weight of sanded mortars also limits the ability to use a greater amount of these mortars beneath the tiles or alternatively to form a complete sublayer between the tiles and the roof underlayment. Because of the stress placed on the roof by the weight of sanded mortar, tiles are typically applied by placing a trowel of mortar on the underlayment and laying a tile on top which results in part of the tile bonding with the mortar and another part of the tile having no contact whatsoever with the mortar. As a result, sanded mortars do not provide a complete bond over the surface of the tile, further exacerbating the problems associated with bond failures by limiting the uplift strength of the resulting bond.

Sanded mortars are typically proportioned at the job site which creates several other drawbacks. Principle among these is the inconsistency of the mortar proportions from batch to batch. When the relative amounts of mortar ingredients vary, whether they vary to stretch an ingredient which is in short supply or they vary because the worker (who may be unskilled) is careless, the hydration, setting time, bonding strength, and hardened mortar strength will vary from batch to batch. The result of this variance is the creation of weak spots in a roof which are more prone to failure than portions of the roof which are held by properly proportioned mortar. A bagged premixed product, manufactured under factory controlled conditions, will eliminate the need for job site proportioning of materials. By so doing, the quality of the resulting tile installation will be more uniform, and the problems discussed above will be reduced.

An addition drawback to site proportioning is the waste material, such as unused sand which must be cleaned up after the job is complete. Of course, the wasted material and the cost of the cleanup adds to the total cost of the tile installation.

Site proportioning and mixing utilizing bulk sand and bags of cement results in higher labor costs; higher equipment maintenance costs; and an environment that can lead to safety problems.

Sanded mortars can be classed in a group described as normal weight mortars. These mortars are typically in the 120 to 145 pound per cubic foot (PCF) range. Known alternative mortars have been developed which improve on the weight problems created by sanded mortars. These mortars fall in a class which can be described as "lightweight" mortars. They include materials such as air-cooled slag, coal cinder, expanded slag, expanded clay, expanded shale, expanded slate, sintered fly ash, scoria, and pumice. While these prior art mortars are "lightweight" as compared to sanded mortars, they in fact carry weight densities of 60 to 125 PCF. Therefore, while improving on sanded mortars, they carry many of the same disadvantages because of their high weight. They have not provided sufficient water holding capacity to allow the best hydration possible while the mortar is setting. In addition, the combination of the reduced amount of roofing mortar which can be used due to weight restrictions, and poor hydration due to insufficient water holding capacity result in reduced bonding and uplift strength than would otherwise be available if a truly lightweight moisture retaining mortar were available.

While addressing the various aspects of tile installation, available mortar compounds have failed to provide a truly lightweight mortar which is capable of retaining sufficient moisture to allow ideal hydration and setting time, reduces risk of worker injury by drastically reducing weight, and allows up to a full bed of mortar to be placed on roofs which in turn provides an insulating layer, increases bonding strength and increases uplift strength.

SUMMARY OF THE INVENTION

The present invention solves the foregoing problems by providing a bagged premixed mortar which uses vermiculite or perlite aggregate in place of heavier aggregates such as sand, etc. The mortar cement is made from portland cement, lime, air entraining agents, and water repelling agents. The resulting compound retains large amounts of moisture which increases hydration time resulting in improved bonding strength, and increased tile uplift strength. The mortar has low weight densities, typically under 75 pounds per cubic foot when wet and under 40 pounds per cubic foot when dry. The mortar is suitable for roofing or floor tile applications.

DESCRIPTION OF THE PREFERRED EMBODIMENT

Figure 1:
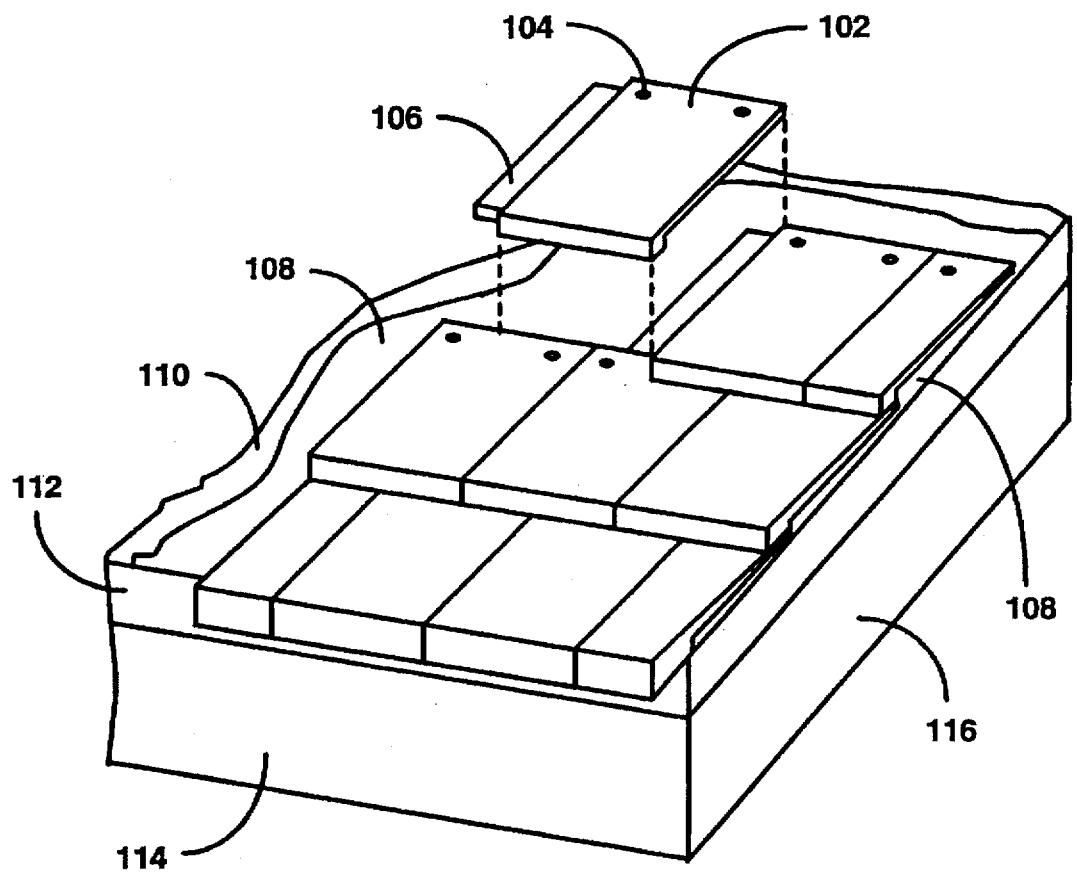
FIG. 1 is a diagram of tiles laid using a full mortar bed.

Having discussed, above, the drawbacks of high weight and reduced moisture retention associated with prior art mortars, attention is now drawn to the novel mortar compounds disclosed herein which address both problems. The new mortar compounds result in a new class of "ultra-light" mortars which have significantly reduced weight densities over those previously available. As used herein, the term "Ultra-light" refers to very low weight mortars ranging 40 or less pounds per cubic foot when dry and 75 or less pounds per cubic foot when wet. The term "lightweight insulating" is used interchangeably with the term "Ultra-light" herein. The foregoing weight ranges being substantially lower than those typically found in the so-called "lightweight" mortars discussed below. A major difference between the new mortar and prior art mortars is that this new lightweight mortar weighs less than ⅓ that of a sanded mortar. This feature make it much easier to mix and place the mortar where required and allows up to a full bed of mortar to be placed on a roof to significantly improve bonding and uplift strength.

In addition, the new mortar compounds have much greater moisture retention and thereby achieve increased bonding to both tile and roof underlayment by providing better hydration. Due to the low weight, the mortar can be provide in premixed form which eliminates the undesirable inconsistencies of job-site preparation and mixing. The low weight also contributes to worker safety by reducing the amount of weight which must be lifted.

In the preferred embodiment, the mortar is premixed and bagged under quality-controlled conditions, it consists of a mixture of vermiculite or perlite or other lightweight aggregate meeting ASTM C332 specifications and a mortar type cement containing portland cement, lime, air-entraining agents and water-repellant agents meeting applicable ASTM specifications. Both air-entraining agents and water-repellant agents are well known in the arts. The proportioning of these materials is accomplished through the formula disclosed herein designed to provide adequate compressive strength along with bonding strengths meeting or exceeding the South Florida building code, Southern Standard building code and ANSI/ASCE standards. ASTM is the American Society for Testing and Materials. ANSI is the American National Standards Institute. The standards used by ASTM and ANSI are published documents, generally available to the public, and therefore do not need to be described further herein.

The mixture of aggregate and mortar cement used in the preferred embodiment is as follows:

17.5 pounds expanded vermiculite, #4 grade, weighing approximately 7 lbs. per cubic foot, graded to meet ASTM C332.

80 pounds mortar cement, meeting ASTM C-91, Federal SS-C-1960/1A. The mortar cement combination used in the preferred embodiment is a mortar type M complying with ASTM specification C270 for plain masonry. It can be made from one part Portland cement and one part masonry cement (which contains lime) or alternatively it can be made from 4 parts Portland cement to 1 part hydrated lime or lime putty. Those skilled in the art will recognize that while the above described mortar cement is used in the preferred combination, other combinations may be employed, such as slight variances in proportions, addition of air entraining and water repelling agents, etc.

The above materials are dry blended in a ribbon blender or similar type mixer and then bagged. While the preferred embodiment envisions 50 pound bags, any suitable bag size which is convenient for a particular application can be used.

Although the preferred embodiment envisions the above mixture, variations to the mixture, as well as other lightweight aggregates can be used. For example, an alternative embodiment using #3 grade Vermiculite with a typical bulk density of 5.7 PCF can be substituted for the vermiculite in the preferred embodiment.

Another embodiment uses perlite in place of vermiculite. perlite aggregates typically range from 7.5 PCF to 15 PCF. As was the case with vermiculite, perlite has a much lower weight density per cubic foot than the "lightweight" aggregates used in prior art mortar mixes. Both the vermiculite and the perlite mortars have dry densities under 40 PCF, as compared to prior art mortars such as pumice, expanded clays or shales, sintered fly ash, air-cooled slag, etc., which typically have weight densities ranging between 60 and 125 PCF.

At this point it might be well to clear the difference between classes of aggregates and the use of the term "lightweight" as well as "lightweight insulating". The terms "dense or normal-weight" and lightweight" are derived from the density of the aggregates as follows:

1. "Normal Weight" aggregates are sand, gravel, crushed stone and air-cooled blast furnace slag.
2. "Lightweight" aggregates are expanded shale, clay and slate; expanded blast furnace slag; sintered fly ash; coal cinders; and natural material such as pumice and scoria.

Concretes containing the aggregates described in items 1 and 2, above, typically range from 60 PCF to 130 PCF. Typical weight densities for concretes using the aforementioned aggregates are as follows:

1. Normal weight:
    Sand and gravel: 130–145 PCF
    Crushed stone and sand: 120–140 PCF
2. Lightweight:
    Air-cooled slag: 100–125 PCF
    Coal cinder: 80–105 PCF
    Expanded slag: 80–105 PCF
    Expanded clay, shale, slate, and sintered fly ash: 75–90 PCF
    Scoria: 75–100 PCF
    Pumice: 60–85 PCF Typical weight densities for concretes using the ultra light (or lightweight insulating) aggregates of the present invention are as follows:

3. Ultra light:
    Vermiculite, #4 grade: 30 PCF
    Vermiculite, #3 grade: 30 PCF
    Perlite: 30 PCF As can be seen from the table above, while the term "lightweight" is used to refer to the aggregates in item 2 above, its usage is more than generous in light of its actual gross weight. In contrast, the "ultra light" Vermiculite and perlite aggregates disclosed in item 3 above are in an entirely different weight class which, in turn, allows an entirely different approach to securing tiles to weight sensitive targets such as roofs. Due to the reduced weight, tiles can be set in a bed of mortar which covers the lower surface of the tile, thereby allowing more area for bonding, a superior, stronger bond with greater uplift resistance, and a layer of insulating mortar which might possibly cover the entire underlayment surface of the roof.

The vermiculite used by the preferred embodiment is a micaceous material which expands or exfoliates when heated at temperatures of approximately 1,400 degrees F. The individual elementary vermiculite platelets are approximately 9.3 A thick (27,000,000 platelets would produce a stack one inch thick). In the natural state, under normal atmospheric conditions, water occupies the inter-platelet spaces. This inter-platelet water is loosely held and is distinguished from the more firmly bound water reported in the chemical analysis below. The exfoliation of the vermiculite under high temperatures irreversibly drives off the water and results in large pores being formed between groups of platelets. The preferred grades of expanded vermiculite that would normally be used by the mortar disclosed herein are #4 grade vermiculite, or alternatively, #3 grade vermiculite. The sieve analysis of the expanded vermiculite of these grades is as follows:

| GRADE | DENSITY | SIEVE APERTURE |
|---|---|---|
| 3 | 5.7 PCF | 0.27 inches (6.73 mm) |
| 4 | 7.0 PCF | 0.19 inches (4.76 mm) |

While the #4 grade is preferable due to its additional fineness, the #3 grade may be used in the production of premixed mortar without any significant performance differences.

The chemical analysis of vermiculite may vary slightly depending on the source of the ores. Typical chemical compositions are as follows:

| ELEMENT | % BY WEIGHT |
|---|---|
| $SiO_2$ | 38–46 |
| $MgO$ | 16–24 |
| $Al_2O_3$ | 11–16 |
| $Fe_2O_3$ | 8–13 |
| $K_2O$ | 4–6 |
| $CaO$ | 1–3 |
| $TiO_2$ | 1–3 |
| $MnO_2$ | 0.1–0.2 |
| $Cr_2O_3$ | 0.05–0.2 |
| $Na_2O$ | 0.1–0.3 |
| $CaO, BaO, V_2O_3, NiO$, etc. | 0–0.5 |

Elements are expressed as oxides. Analysis based on oven-dryer weight (212 degrees F. or 100 degrees C.). The relative amounts of oxides which were determined by the sodium carbonate fusion method are listed without reference to actual crystalline arrangement.

The perlite used by the alternative embodiment is a naturally occurring silicious rock, usually described as a "volcanic glass", that expands up to 20 times its original volume when subjected to heat in the range of 1,400 to 1,800 degrees F. The expansion is due to the combined water of 2 to 6 percent that vaporizes and forms many microscopic bubbles in the molten material. The color after explosion is white, although the perlite ore as mined ranges from black to white. The preferred gradations of expanded perlite that would normally be used by the mortar disclosed herein, and meeting ASTM C-332 standard, are as follows:

| US STANDARD | % RETAINED BY VOLUME | |
|---|---|---|
| SIEVE # | MAXIMUM | MINIMUM |
| 8 | 15 | 0 |
| 16 | 60 | 15 |
| 30 | 80 | 40 |
| 50 | 95 | 75 |
| 100 | 100 | 90 |

As a natural glass, perlite is classed as chemically inert and has a PH of about 7. It has no accelerating effect on Portland cement.

Although perlite concrete aggregate is preferable, perlite plaster aggregate can be substituted without significantly altering results. The gradations of perlite plaster aggregate that can be used by the mortar disclosed herein, and meeting ASTM C-35 standard, are as follows:

| US STANDARD | % RETAINED BY VOLUME | |
|---|---|---|
| SIEVE # | MAXIMUM | MINIMUM |
| 8 | 5 | 0 |
| 16 | 60 | 10 |
| 30 | 95 | 45 |
| 50 | 98 | 75 |
| 100 | 100 | 88 |

The chemical analysis of perlite may vary slightly depending on the source of the ores. A typical chemical analysis is as follows:

| ELEMENT | % BY WEIGHT |
|---|---|
| $SiO_2$ | 71–75 |
| $Al_2O_3$ | 12.5–18 |
| $K_2O$ | 2.9–4 |
| $CaO$ | 0.5–2 |
| $Fe_2O_3$ | 0.5–1.5 |
| $MgO$ | 0.1–0.5 |
| $TiO_2$ | 0.03–0.2 |
| $MnO_2$ | 0.03–0.1 |
| $SO_3$ | 0–0.2 |
| $FeO$ | 0–0.1 |
| $Cr$ | 0–0.1 |
| $Ba$ | 0–0.05 |
| $PbO$ | 0–0.03 |
| $NIO$ | Trace |
| $Cu$ | Trace |
| $B$ | Trace |
| $Be$ | Trace |
| $Mo$ | Trace |
| $As_2O_3$ | <0.1 ppm |
| Free silica | 0–2 |
| Total chlorides | Trace to 0.2 |
| Total sulphates | None |

Elements are expressed as oxides. Analysis based on oven-dry weight (212 degrees F. or 100 degrees C.). The relative amounts of oxides which were determined by the sodium carbonate fusion method are listed without reference to actual crystalline arrangement.

Several advantages attributable to the use of vermiculite and perlite are as follows:

1. Weight Advantage

The embodiments using vermiculite or perlite as the aggregate will have a weight density of (premixed by dry weight) approximately ranging approximately from 30 to 35 PCF. This contrasts sharply with premixed sanded mortars which typically have weight densities between 120 to 150 PCF. This provides a significant advantage in handling and shipping. The mixed mortar, after addition of water to reach desired consistency, will weigh approximately 75% less than sanded mortars. As a consequence, moving these new mortars to a roof, to areas where the roof tiles are being applied, or even to areas where floor tiles are being applied, is easier, faster, and safer.

2. Moisture Retention

Since dry roof tile absorbs much water from the mortar, the higher holding capacity of the vermiculite and perlite based mortars can withstand this absorbency and still contain enough water to keep the mortar plastic enough to assure bonding to the roof tile as well as the roof underlayment. It also allows the cement to complete the hydration process and achieve its highest strength.

3. Insulation

Vermiculite and perlite mortars provide superior insulation values than heavier sanded mortars. A benefit of its ultra light weight is that the mortar could be used to completely bed the roof tile with an average of one inch of mortar across the entire roof area. One inch of vermiculite mortar would provide an R factor of 1.49, and perlite mortar an R factor of 1.72. The insulating properties of these mortars help protect the roofing membranes which comprise the underlayment from the effect of heat buildup within the clay or concrete tiles. By so doing, the longevity of the waterproofing membranes that protect the roof from water is increased. An additional benefit is also provided by the fire resistant qualities of the mortar, especially in areas prone to brush fires or forest fires.

4. Uplift Resistance

The improved water retention capability of these mortars result in consistent bond strengths on both the bonds to the tile and the bonds to the roof underlayment. Compressive strengths are related to density. While the mortar necessarily has a lower compressive strength than normal weight mortars, it has more than enough compressive strength for roof tile applications. Further, its high uplift resistance and lower load on the roof make this mortar very advantageous as compared to prior art mortars.

While mortars can be made using any of the aforementioned non-vermiculite and non-perlite aggregate materials, none of them allow the ultra-light densities provided by the vermiculite or perlite compounds disclosed herein. Likewise, while the preferred embodiment uses a particular ratio of ingredients, variations in the ratio of aggregate to cement may be used to produce an effective ultra light mortar. Aggregate to cement ratios may vary according to application needs or area requirements. For example, the weight density of mortar used for floor tile is less critical than that used for roof tile because the floor of a structure is typically stronger than the roof. However, for installation of tile in a large multi-story building, the accumulated weight density on many floors may have an impact on total building weight and construction considerations. By providing a very low weight density, ultra light mortars may eliminate tons of deadload which would in turn enhance the options available (e.g., support sizes, extra features, etc.) to architects when designing buildings.

Application of the premixed ultra lightweight tile mortar would be similar to current applications using sanded mortars. However, due to its lightweight properties, a full bed or mortar could be used on roof without endangering the structure through overloading. A sanded mortar adds approximately 4 to 5 lbs (dry weight) per tile while the mortar disclosed herein would add only 1.5 to 2.5 lbs. (dry weight) per tile. This, of course, would vary depending upon the type tile and the amount of mortar being used to bed the tile to the roofing. For example, tiles of varying shapes such as barrel tiles, Spanish S tiles, flat tiles, etc., each require different amounts of mortar for proper installation in accordance with government codes and manufacturer's specifications.

Referring to FIG. 1, this figure shows the installation of a flat tile using either a vermiculite or perlite mortar. Tiles 102 overlap one another in typical fashion. Nail holes 104 are provided to allow nailing of the tiles to the roof when required by building codes. Edges 106 allow the tiles to be interlocked during installation. Metal drip edge 112, facia board 114, barge board 116, and underlayment 110 are the same as those used in the prior art. Due to the low weight of the mortars in the preferred embodiments, mortar 108 could be laid in a bed which covers the entire surface, as shown. This provides several advantages. First, since the entire undersurface of tile 102 can be bonded to mortar 108, the increased amount of bonding area greatly increases the strength of the bond. Second, by increasing bond strength, the uplift resistance is increased making it harder to damage the roof in the case of storms. Third, the low weight of the mortar allows a continuous layer of mortar to be placed on the roof which then provides an additional benefit of acting as another insulating layer for the structure.

One of the important criteria a tile mortar must meet is the minimum uplift resistance required by government building codes. By way of example, the South Florida Building Codes will be used to illustrate this feature of the invention. Due to the annual threat of hurricanes, the South Florida Building Code is probably the most restrictive in terms of uplift resistance. The South Florida Building Code requires that mortar applied tile must be tested and must achieve a minimum uplift resistance of 55.5. lbs. per square foot (PSF). Meeting this particular code requirement for both non-coastal and coastal zone applications would probably mean acceptance by all U.S. building codes. However, notwithstanding the high standards of the South Florida Building Codes, in Hurricane Andrew (1993) poor performance of tile roofs caused by mortar bond failures and poor uplift resistance resulted in serious damage to residences with tile roofs and neighboring residences due to these heavy tiles becoming airborne projectiles.

In accordance with the South Florida Building Code protocol for mortar, testing showed that the premixed ultra-light mortar disclosed herein exceeded the minimum requirements of the South Florida Building Code by a large margin. These uplift test results averaged in excess of 100 lbs PSF in sustained uplift resistance.

A Description of the Testing Procedure Follows

1. The test protocol was the same as required for product approval of clay and concrete roof tiles for "mud on" installation.
2. Each product is tested by construction a 4'×10' deck panel which is a 2"×4" wood frame covered ⅝" plywood nailed according to code. The plywood is covered with 30# felt which was secured by roofing nails and tin caps. The felt is covered with hot mopped roof tar and 90# rolled roofing.
3. Five sets of three tiles are "mudded" on each panel with two tile of each set for the bottom course and a single tile for the next course, using one 10 inch trowel full of mortar for each tile.
4. The panels are left undisturbed until time for testing, approximately two weeks later.
5. The top tile of each set is tested for static uplift by applying a vertical force to the leading edge by means of two bolts which were inserted through holes pre-drilled into the tile.

| DETAILS OF MORTAR AND TEST RESULTS | |
|---|---|
| Pounds of mortar mix | 100 |
| Pounds standard sand | 0 |
| Pounds 20/30 sand | 0 |
| Water (approx. gals.) | 15 |
| Minutes of mix time | 5 |
| Cone penetrometer reading | 39 |
| Compressive strength of 2 inch cubes @ 7 days, p.s.i. | 350 |
| average cubic weight in grams | 140 |
| maximum uplift sustained in total pounds per tile | |
| 1 | 65 |
| 2 | 106 |
| 3 | 97 |
| 4 | 75 |
| 5 | 90 |
| average | 86.6 |
| average Maximum sustained uplift in lbs./sq. ft. | 104.3 |

Another advantage of these new premixed ultra lightweight mortars is that they can be factory prepared under rigid quality control conditions. This will assure the building departments of a consistent performance and will eliminate the concerns over non-supervised job-site proportioning by unskilled laborers.

In summary, qualities of this new ultra lightweight mortar when compared to job-site mixed mortar or premixed sanded mortars are as follows:

A. Uniform, factory prepared, providing a consistent mortar.
B. Provides a very strong bond to roofing as well as tile.
C. Water-holding capacity is greater than sanded mixes allowing mortar to cure properly.
D. Tile as delivered, or as stacked on roof, may be placed on this mortar without concern about pulling water out of the mix, premature drying out or setting.
E. This mortar is lightweight—about one-third that of sand mixes.
F. A full bed of this mortar provides a layer of insulating concrete below the tile, protecting the roofing membranes as well as adding comfort to the home.
G. No messy sand piles, no waste on job-site.
H. Less heavy labor required—no sand shoveling. Much less weight to carry to roof.
I. This mortar weighs approximately 33 PCF and contains controlled amounts of both aggregate and cement. Sanded premixed mortars weigh approximately 120 PCF.
J. Consistent mortar. Each mix will be alike with controlled ingredients.
K. Faster mixing and ease of handling lightweight mortar allows for faster operation, saving time and money.
L. All ingredients meet ASTM standards.

There are no lightweight, premixed mortars for roof tile and floor tile applications with these unique qualities available in the construction industry.

While the invention has been described with respect to a preferred embodiment thereof, it will be understood by those skilled in the art that various changes in detail may be made therein without departing from the spirit, scope, and teaching of the invention. For example, the ratio of ingredients may vary, specific mines may yield vermiculite having slightly different chemical compositions than vermiculite or perlite from other mines, etc. Accordingly, the invention herein disclosed is to be limited only as specified in the following claims.

I claim:

1. A high water retention lightweight mortar for use with clay and concrete tiles, comprising:

a sandless aggregate, at least a portion of the aggregate comprised of aggregate meeting ASTM standard C-332;

masonry cement;

the sandless aggregate having a water retaining capability such that when water is mixed with the mortar, the ratio of the weight of the water to the weight of the mortar is approximately 1:1; and the aggregate and masonry cement when mixed to form the mortar having a maximum uplift strength in total pounds per tile greater than 60 pounds when the mortar;

whereby the water retaining capacity of the sandless aggregate provides increased moisture levels that increase mortar hydration and setting time.

2. A mortar, as in claim 1, wherein the aggregate has a dry density less than 16 pounds per cubic foot.

3. A mortar, as in claim 2, wherein the aggregate and masonry cement, when mixed to form the mortar, have a dry density between 30 and 35 pounds per cubic foot.

4. A mortar, as in claim 3, wherein the aggregate and masonry cement, when mixed with water to form the mortar, have a wet density equal to or less than 75 pounds per cubic foot.

5. A mortar, as in claim 1, wherein at least a portion of the sandless aggregate is expanded perlite aggregate.

6. A mortar, as in claim 5, wherein the aggregate has a dry density less than 16 pounds per cubic foot.

7. A mortar, as in claim 6, wherein the aggregate and masonry cement, when mixed to form the mortar, have a dry density between 30 and 35 pounds per cubic foot.

8. A mortar, as in claim 7, wherein the aggregate and masonry cement, when mixed with water to form the mortar, have a wet density equal to or less than 75 pounds per cubic foot.

* * * * *